(12) United States Patent
Schmid et al.

(10) Patent No.: US 11,262,452 B2
(45) Date of Patent: Mar. 1, 2022

(54) ULTRASONIC SENSOR DEVICE

(71) Applicant: Robert Bosch GmbH, Stuttgart (DE)

(72) Inventors: Dirk Schmid, Simmozheim (DE); Michael Schumann, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 374 days.

(21) Appl. No.: 16/473,727

(22) PCT Filed: Jan. 4, 2018

(86) PCT No.: PCT/EP2018/050182
§ 371 (c)(1),
(2) Date: Jun. 26, 2019

(87) PCT Pub. No.: WO2018/137904
PCT Pub. Date: Aug. 2, 2018

(65) Prior Publication Data
US 2020/0049817 A1     Feb. 13, 2020

(30) Foreign Application Priority Data
Jan. 26, 2017   (DE) .................... 10 2017 201 214.5

(51) Int. Cl.
*G01S 15/931* (2020.01)
*G01S 7/521* (2006.01)
(Continued)

(52) U.S. Cl.
CPC ............ *G01S 15/931* (2013.01); *G01S 7/521* (2013.01); *G01S 15/87* (2013.01); *G01S 15/8979* (2013.01); *G01S 2015/938* (2013.01)

(58) Field of Classification Search
CPC .... G01S 15/8979; G01S 7/521; G01S 15/931; G01S 7/52; G01S 15/87; G01S 2015/938
See application file for complete search history.

(56) References Cited

U.S. PATENT DOCUMENTS

| | | | | |
|---|---|---|---|---|
| 2004/0215382 A1* | 10/2004 | Breed | ............... | B60R 21/01552 701/45 |
| 2006/0271296 A1* | 11/2006 | Takeichi | ............. | G01S 7/52004 701/300 |

(Continued)

FOREIGN PATENT DOCUMENTS

| | | |
|---|---|---|
| DE | 19901847 A1 | 2/2000 |
| DE | 10106142 A1 | 8/2002 |

(Continued)

OTHER PUBLICATIONS

International Search Report for PCT/EP2018/050182, dated May 2, 2018.

*Primary Examiner* — Isam A Alsomiri
*Assistant Examiner* — Amie M Ndure
(74) *Attorney, Agent, or Firm* — Norton Rose Fulbright US LLP; Gerard Messina

(57) ABSTRACT

An ultrasonic sensor device including a plurality of ultrasonic sensors and a control unit for operating the ultrasonic sensors, the control unit being configured to activate selectively either a first group of the ultrasonic sensors or a second group of the ultrasonic sensors at the same time, so that the activated ultrasonic sensors emit an ultrasonic signal, each ultrasonic sensor of the first group being situated adjacent to at least one ultrasonic sensor of the second group and each ultrasonic sensor of the second group being situated adjacent to at least one ultrasonic sensor of the first group, and the control unit being configured to operate adjacent active ultrasonic sensors using different frequency-modulated excitation patterns.

14 Claims, 3 Drawing Sheets

(51) Int. Cl.
    *G01S 15/87*     (2006.01)
    *G01S 15/89*     (2006.01)

(56) References Cited

U.S. PATENT DOCUMENTS

| | | | | |
|---|---|---|---|---|
| 2008/0064413 A1* | 3/2008 | Breed | ............. | B60N 2/853 |
| | | | | 455/456.1 |
| 2008/0272906 A1* | 11/2008 | Breed | ............. | G01S 7/539 |
| | | | | 340/539.11 |
| 2010/0182874 A1* | 7/2010 | Frank | ............. | G01S 15/32 |
| | | | | 367/101 |
| 2010/0196136 A1* | 8/2010 | Gunji | ............. | G01R 3/00 |
| | | | | 414/806 |
| 2014/0029385 A1* | 1/2014 | Schumann | ........... | G01S 15/878 |
| | | | | 367/99 |
| 2016/0357187 A1* | 12/2016 | Ansari | ............. | G01S 13/862 |
| 2016/0362164 A1* | 12/2016 | Page | ............. | B63B 49/00 |

FOREIGN PATENT DOCUMENTS

| | | | | |
|---|---|---|---|---|
| DE | 102006019833 A1 | 12/2006 | | |
| DE | 102007029959 A1 | 1/2009 | | |
| DE | 102012202583 A1 | 8/2013 | | |
| DE | 102016224932 A1 * | 6/2018 | ........... | G01S 15/931 |
| GB | 2501361 A * | 10/2013 | ............. | G01S 7/523 |
| JP | H09113618 A | 5/1997 | | |
| JP | 2006298266 A | 11/2006 | | |
| JP | 2006317186 A | 11/2006 | | |
| JP | 2013538344 A | 10/2013 | | |

* cited by examiner

ULTRASONIC SENSOR DEVICE

FIELD

The present invention relates to an ultrasonic sensor device. The ultrasonic sensor device is advantageously usable in a vehicle.

BACKGROUND INFORMATION

Conventional vehicles often include ultrasound-based distance measuring systems. Ultrasound-based measuring systems are used to measure a distance to an object located in front of an ultrasonic sensor. The ultrasonic sensors used are based for this purpose on the pulse-echo method. In this mode, the sensor emits an ultrasonic pulse and measures the reflection of the ultrasonic pulse induced by an object, thus the echo. The distance between sensor and object is computed via the measured echo runtime and the speed of sound. The ultrasonic sensor functions as emitter and receiver.

In conventional vehicles, four or six ultrasonic sensors are typically inserted into a bumper to be able to measure surroundings ahead of and behind the vehicle. The specifications ahead of and behind relate to a typical travel direction of the vehicle. To be able to detect the surroundings as quickly as possible, it is helpful if the sensors on the bumpers emit simultaneously and thus process pieces of information in parallel. Special excitation patterns are used for this purpose in particular, which are also referred to as codes, which are used for the emission of the ultrasonic pulse. The processing of the echoes is carried out by signal-adapted filters, so-called matched filters.

Ideal codes are characterized in that the codes are orthogonal to one another. This means that the codes have a maximum dissimilarity, so that a matched filter attenuates all codes except for the associated code to amplitude 0. In practice, however, such a complete suppression by the matched filters is not implementable. In particular, the suppression is poor if only a small bandwidth is available for the codes. In transducers which are designed in such a way that they operate in resonance, the bandwidth is particularly strongly restricted and the suppression is accordingly deficient.

SUMMARY

The ultrasonic sensor device according to the present invention permits a maximization of the suppression of external codes and thus achieves optimum separability of individual ultrasonic codes. In this way, a plurality of measurements may be carried out in parallel, whereby surroundings of the ultrasonic sensor device may be detected in a short time, since the parallel processing of multiple ultrasonic signals is enabled. The ultrasonic sensor device therefore has advantages in particular if it is used in a vehicle, since rapid detection of objects in the surroundings represents a significant advantage here.

The ultrasonic sensor device according to the present invention includes a plurality of ultrasonic sensors. The plurality of ultrasonic sensors is configured to either emit an ultrasonic pulse or receive an echo of an ultrasonic pulse. Each of the ultrasonic sensors is thus an emitter and receiver at the same time. The ultrasonic sensor device additionally includes a control unit for operating the ultrasonic sensors. For this purpose, the control unit is configured to use the ultrasonic sensors alternately as emitters or as receivers. If an operation as an emitter takes place, the particular ultrasonic sensor is thus excited using an excitation pattern, whereby it emits an ultrasonic pulse. In contrast, if the ultrasonic sensor is used as a receiver, there is thus no activation and the ultrasonic sensor generates a corresponding signal, which is detectable by the control unit, upon incidence of an ultrasonic pulse. The control unit is additionally configured to alternately activate either a first group of the ultrasonic sensors or a second group of the ultrasonic sensors at the same time. Activate is to be understood to mean that the ultrasonic sensors emit an ultrasonic signal. Activate thus means in particular that the ultrasonic sensors are excited using an excitation pattern, whereby the emission of the ultrasonic signal is initiated. If no activation takes place, the respective ultrasonic sensor is thus exclusively used as a receiver. An active ultrasonic sensor is thus to be understood within the scope of the present invention as an ultrasonic sensor which instantaneously emits an ultrasonic signal, in particular an ultrasonic pulse. An ultrasonic pulse is to be understood as a time-limited ultrasonic signal. Finally, the control unit is configured to operate adjacent active ultrasonic sensors using different frequency-modulated excitation patterns. Adjacent active ultrasonic sensors means that only those ultrasonic sensors are taken into consideration which actually emit an ultrasonic signal. Those ultrasonic signals which were not activated by the control unit are not taken into consideration in this case. It is thus particularly advantageously provided that one inactive ultrasonic sensor is located between two active ultrasonic sensors. This means that the ultrasonic sensors are classified into the first group and the second group in such a way that no ultrasonic sensors of the first group are arranged adjacent and no ultrasonic sensors of the second group are arranged adjacent. Rather, each ultrasonic sensor from the first group is arranged adjacent to one ultrasonic sensor from the second group. Each ultrasonic sensor from the second group is also arranged adjacent to one ultrasonic sensor from the first group. In one particularly advantageous specific embodiment, the ultrasonic sensors are operated using different linear, frequency-modulated chirps, which means that the frequency of the excitation changes linearly within a predefined time window. Due to the measures of the frequency-modulated excitation pattern, which differs in adjacent active ultrasonic sensors, and also due to the above-described advantageous separation of active ultrasonic sensors by an inactive ultrasonic sensor, the echoes which were reflected from objects in the surroundings to the ultrasonic sensor device are prevented from being unable to be separated. Rather, each echo may be unambiguously associated with an ultrasonic sensor of the plurality of ultrasonic sensors. A high separability by corresponding filters, in particular by matched filters, is achieved by the frequency-modulated excitation patterns.

Preferred refinements of the present invention are described herein.

It is preferably provided that the frequency-modulated excitation patterns include a continuous frequency change within a predefined bandwidth. The predefined bandwidth is advantageously identical for all excitation patterns with respect to its size, but may also be different in particular. Furthermore, it is advantageously provided that the frequency-modulated excitation patterns completely or at least partially differ in the frequency band which they scan. The continuous frequency change advantageously means a linear frequency change, the frequency being able to be linearly increased or linearly decreased. The linear frequency change enables a simple operation of the ultrasonic sensors by the control unit. Alternatively, other operation options are conceivable, such as a square frequency change or another nonlinear frequency change in particular. Such a differentiation of the frequency-modulated excitation patterns enables a secure and reliable suppression of external signals in corresponding filters. This suppression is maximized if the frequency ranges of the different excitation patterns, as described above, overlap at most partially over their entire bandwidth. It is additionally particularly advantageously provided that the pulse duration is long or the coefficient numbers of matched filters are large. This is advantageously achieved for pulse lengths of more than 1 ms.

It is additionally particularly advantageously provided that adjacent active sensors have opposing frequency changes. In particular, the frequency curve of adjacent active ultrasonic sensors is thus designed in such a way that in one ultrasonic sensor, a continuous, in particular linear frequency increase takes place and in the other ultrasonic sensor, a continuous, in particular linear frequency decrease takes place. The bandwidth of the frequency change advantageously encompasses at least 3 kHz.

It is particularly advantageously provided that the first group and the second group of the ultrasonic sensors each include half of the ultrasonic sensors. One half of the ultrasonic sensors is therefore operable simultaneously in each case independently of the other half of the ultrasonic sensors. The ultrasonic sensors of the first group and the second group are preferably situated alternately to enable the above-described maximum separability of the ultrasonic signals.

In one advantageous specific embodiment, it is provided that the ultrasonic sensors include two inner ultrasonic sensors and two outer ultrasonic sensors. Each inner ultrasonic sensor is situated adjacent to one further inner ultrasonic sensor and one outer ultrasonic sensor. This means that the two outer ultrasonic sensors enclose the inner ultrasonic sensors, so that each inner ultrasonic sensor has two adjacent ultrasonic sensors, while each outer ultrasonic sensor only has one adjacent ultrasonic sensor. This means in particular that each outer ultrasonic sensor is situated adjacent to one inner ultrasonic sensor, while each inner ultrasonic sensor is situated adjacent to one inner ultrasonic sensor and one outer ultrasonic sensor. The control unit is preferably configured to activate in each case one inner ultrasonic sensor and one outer ultrasonic sensor, which are not situated adjacent, at the same time. This means that one outer ultrasonic sensor and the inner ultrasonic sensor not situated adjacent to said outer ultrasonic sensor form the first group of ultrasonic sensors, while the remaining ultrasonic sensors, i.e., the remaining outer ultrasonic sensor and the remaining inner ultrasonic sensor, form the second group of ultrasonic sensors. The first group of ultrasonic sensors and the second group of ultrasonic sensors are thus in turn situated alternately. The control unit is preferably moreover configured to operate the outer ultrasonic sensors using a first frequency-modulated excitation pattern and to operate the inner ultrasonic sensors using a second frequency-modulated excitation pattern. The first frequency-modulated excitation pattern is different from the second frequency-modulated excitation pattern. In this way, the above-described maximum separability of the ultrasonic signals is achieved. Thus, at a first point in time, one outer ultrasonic sensor and one inner ultrasonic sensor not adjacent thereto are advantageously operated to emit an ultrasonic pulse. The active ultrasonic sensors, i.e., the active inner ultrasonic sensor and the active outer ultrasonic sensor, are thus separated by one inactive ultrasonic sensor. Moreover, the active ultrasonic sensors are operated by different excitation patterns, the first excitation pattern and the second excitation pattern. The excitation patterns, as described above, particularly advantageously have continuous frequency changes within a predefined bandwidth. It is also particularly advantageously provided that the frequency changes of the first frequency-modulated excitation pattern and of the second frequency-modulated excitation pattern differ, in particular the first frequency-modulated excitation pattern including a frequency pattern having a continuous increase of the frequency, while the second frequency-modulated excitation pattern includes a pattern having a continuously decreasing frequency.

In one alternative specific embodiment, it is provided that the ultrasonic sensors include two adjacent first outer ultrasonic sensors, two inner ultrasonic sensors, and two adjacent second outer ultrasonic sensors. It is provided that each inner ultrasonic sensor is situated adjacent to one further inner ultrasonic sensor and either one first outer ultrasonic sensor or one second outer ultrasonic sensor. The first outer ultrasonic sensors are situated adjacent to one another, the second outer ultrasonic sensors are also situated adjacent to one another. This means that one of the first outer ultrasonic sensors is exclusively situated adjacent to the other outer ultrasonic sensor. The other first outer ultrasonic sensor is thus situated adjacent to one inner ultrasonic sensor and the above-mentioned first outer ultrasonic sensor. This also applies to the second outer ultrasonic sensors. A second outer ultrasonic sensor is also situated here both adjacent to one inner ultrasonic sensor and another second outer ultrasonic sensor. The other second outer ultrasonic sensor does not have a further neighbor in addition to the above-mentioned second outer ultrasonic sensor. The control unit is configured to simultaneously activate in each case one inner ultrasonic sensor, one first outer ultrasonic sensor, and one second outer ultrasonic sensor, none of which are situated adjacent to one another. One first outer ultrasonic sensor, one inner ultrasonic sensor, and one second outer ultrasonic sensor thus form the first group, while the remaining ultrasonic sensors form the second group. It is again preferably provided that all ultrasonic sensors of the first group and the second group are situated alternately in relation to one another. Finally, the control unit is preferably configured to operate the first outer ultrasonic sensors and the second outer ultrasonic sensors using a first frequency-modulated excitation pattern and the inner ultrasonic sensors using a second frequency-modulated excitation pattern. It is again provided that the first frequency-modulated excitation pattern and the second frequency-modulated excitation pattern are different from one another. In particular, the first frequency-modulated excitation pattern and the second frequency-modulated excitation pattern have the above-described differences. It is preferably provided that a maximum distance is present between the active ultrasonic sensors, by one inactive ultrasonic sensor always being located between two active ultrasonic sensors. Furthermore, it is provided that the ultrasonic signals may be optimally separated, since adjacent active ultrasonic sensors have different frequency-modulated excitation patterns, only the excitation patterns of the first outer ultrasonic sensors and the second outer ultrasonic sensors being identical. However, due to the large distance of the first outer ultrasonic sensors and the second ultrasonic sensors, this only has a minor effect on the separability of the ultrasonic signals received by the ultrasonic sensor device.

In the two above-described alternatives, it is advantageously provided that the first frequency-modulated excitation pattern includes a change of a frequency having a first bandwidth. The first bandwidth is between 3 kHz and 12 kHz, preferably 5 kHz. The change of the frequency takes place linearly in particular. The second frequency-modulated excitation pattern includes a change of a frequency having a second bandwidth. The second bandwidth is advantageously between 3 kHz and 12 kHz, particularly advantageously 5 kHz. It is again advantageously provided that a linear change of the frequency takes place. Finally, it is advantageously provided that a first frequency curve which extends over the first bandwidth is different from a second frequency curve of the second frequency-modulated excitation pattern, which extends over the second bandwidth. The first frequency curve and the second frequency curve thus ensure that the ultrasonic signals never emit an ultrasonic signal, in particular an ultrasonic pulse, whose frequency overlaps with another ultrasonic pulse which was generated with the aid of a different excitation pattern. In this way, optimum separability in filters is enabled. Such filters are in particular matched filters, as described above. Ultrasonic sensors usually have a low bandwidth of at most 12 kHz, in particular of at most 10 kHz. Due to the described first frequency-modulated excitation pattern and the second frequency-modulated excitation pattern, the possible bandwidths of the excitation patterns having described advantageous 5 kHz are optimally utilized from the total available bandwidth. At the same time, it is made possible for the frequency curves of the first frequency-modulated excitation pattern and the second frequency-modulated excitation pattern not to overlap. In this way, a maximum separability of the frequency curves is ensured, since external signals are optimally suppressible in appropriate filters, in particular in matched filters. It is thus made possible to operate a plurality of ultrasonic sensors in parallel without the risk existing of confusion of the emitted ultrasonic pulses. Surroundings of the ultrasonic sensor device may thus be detected securely and reliably, such a detection taking place within a limited time window.

The first frequency curve advantageously opposes the second frequency curve. This means that the first frequency curve advantageously includes a rise of the frequency, while the second frequency curve includes a drop of the frequency or vice versa. The ultrasonic pulses may thus be optimally separated further, since not only the frequencies themselves differ, but rather also the change of the frequencies is different.

In another preferred specific embodiment, it is provided that the ultrasonic sensors include two outer ultrasonic sensors and four adjacent inner ultrasonic sensors. The outer ultrasonic sensors are situated in such a way that they enclose the inner ultrasonic sensors, which are all adjacent to one another. This means that each outer ultrasonic sensor is advantageously situated adjacent to at most one inner ultrasonic sensor. The inner ultrasonic sensors are thus either situated adjacent to two further inner ultrasonic sensors or alternatively to one outer ultrasonic sensor and one further inner ultrasonic sensor. The control unit is configured to simultaneously activate in each case two inner ultrasonic sensors and one outer ultrasonic sensor, none of which are situated adjacent to one another. This means that one inactive ultrasonic sensor is provided between two active ultrasonic sensors. The control unit is additionally configured to operate the outer ultrasonic sensors using a first frequency-modulated excitation pattern and in each case one inner ultrasonic sensor using a second frequency-modulated excitation pattern and one third frequency-modulated excitation pattern. The two active inner ultrasonic sensors therefore have different frequency-modulated excitation patterns, namely the second frequency-modulated excitation pattern and the third frequency-modulated excitation pattern. Moreover, the additional activated outer ultrasonic sensor has a different excitation pattern, namely the first frequency-modulated excitation pattern. The first frequency-modulated excitation pattern, the second frequency-modulated excitation pattern, and the third frequency-modulated excitation pattern are thus formed differently from one another. All signals which are emitted by the active ultrasonic sensors are thus different from one another and are thus simple to separate with little effort. In this way, a quick detection of surroundings of the ultrasonic sensor device is enabled, a confusion of ultrasonic pulses which were emitted by the individual ultrasonic sensors being prevented by the use of completely different signals, the surroundings may thus be detected securely and reliably.

The first frequency-modulated excitation pattern preferably includes a change of a frequency having a first bandwidth. The first bandwidth is advantageously between 3 kHz and 12 kHz, in particular 3 kHz. The change of the frequency in particular takes place linearly. The second frequency-modulated excitation pattern includes a change of a frequency having a second bandwidth. The second bandwidth is between 3 kHz and 12 kHz, in particular 3 kHz. This change also advantageously takes place linearly. The third frequency-modulated excitation pattern includes a change of a frequency having a third bandwidth, the third bandwidth including between 3 kHz and 12 kHz, preferably 3 kHz. This change of the frequency also advantageously takes place linearly. Furthermore, it is provided that a first frequency curve of the first frequency-modulated excitation pattern, which extends over the first bandwidth, a second frequency curve of the second frequency-modulated excitation pattern, which extends over the second bandwidth, and a third frequency curve of the third frequency-modulated excitation pattern, which extends over the third bandwidth, are all different from one another. In this way, it is achieved that the first frequency curve, the second frequency curve, and the third frequency curve do not overlap. Rather, every ultrasonic pulse which is emitted by the ultrasonic sensor device over its entire bandwidth of the frequency change has a different frequency from every other ultrasonic pulse which was emitted by the ultrasonic device. A separation of the emitted ultrasonic pulses is thus enabled simply and with little effort. An ultrasonic sensor in particular includes a maximum bandwidth of 12 kHz, in particular 10 kHz. This maximum bandwidth is optimally utilized for emitting the different ultrasonic pulses by the use of the first bandwidth, the second bandwidth, and the third bandwidth. This means that each excitation pattern includes a maximum bandwidth, but at the same time overlapping of the excitation patterns in their frequencies is completely avoided.

In one alternative specific embodiment, the above-described first frequency-modulated excitation pattern includes a change of a frequency having a first bandwidth. The first bandwidth is between 3 kHz and 12 kHz, preferably 5 kHz. The change of the frequency again preferably takes place linearly. The second frequency-modulated excitation pattern includes a change of a frequency having a second bandwidth. The second bandwidth is between 3 kHz and 12 kHz, preferably 5 kHz. A change of the frequency advantageously also takes place linearly here. The third frequency-modulated excitation pattern includes a change of a frequency having a third bandwidth, the third bandwidth being between 3 kHz and 12 kHz, in particular 9 kHz. The change of the frequency also advantageously takes place linearly here. It is moreover provided that a third frequency curve of the third frequency-modulated excitation pattern, which extends over the third bandwidth, is partially overlaid with a first frequency curve of the first frequency-modulated excitation pattern, which extends over the first bandwidth, and/or with a second frequency curve of the second frequency-modulated excitation pattern, which extends over the second bandwidth. At the same time, it is advantageously provided that the first frequency curve differs from the second frequency curve, so that the first frequency curve does not overlap with the second frequency curve. An overlap is therefore only provided with respect to the third frequency curve. The maximum bandwidth of the ultrasonic sensors again includes 12 kHz, in particular 10 kHz. By way of the above-described advantageous first bandwidth, second bandwidth, and third bandwidth, the maximum bandwidth is thus optimally utilized by the second bandwidth and the third bandwidth, without the second frequency curve and the third frequency curve overlapping. At the same time, the first frequency-modulated excitation pattern having the first bandwidth has a very high bandwidth in relation to the maximum bandwidth of the ultrasonic sensors. Due to the large first bandwidth, the first excitation pattern has advantages with respect to Doppler robustness in the case of the outer ultrasonic sensors, such a robustness being able to be used for higher speeds during the detection of objects in the surroundings. A minor worsening of the separability of the individual codes due to the overlap of the first frequency curve with the second frequency curve and/or the third frequency curve is thus accepted due to an improved Doppler robustness and a higher detection speed resulting therefrom.

The first frequency curve is particularly advantageously opposite to the second frequency curve and/or the third frequency curve. Alternatively or additionally, the second frequency curve is in particular opposite to the third frequency curve. In this way, an improvement of the separability of the individual ultrasonic pulses which were emitted by the ultrasonic sensors again takes place.

BRIEF DESCRIPTION OF THE DRAWINGS

Exemplary embodiments of the present invention are described in detail hereafter with reference to the figures.

DETAILED DESCRIPTION OF EXAMPLE EMBODIMENTS

Figure 1:
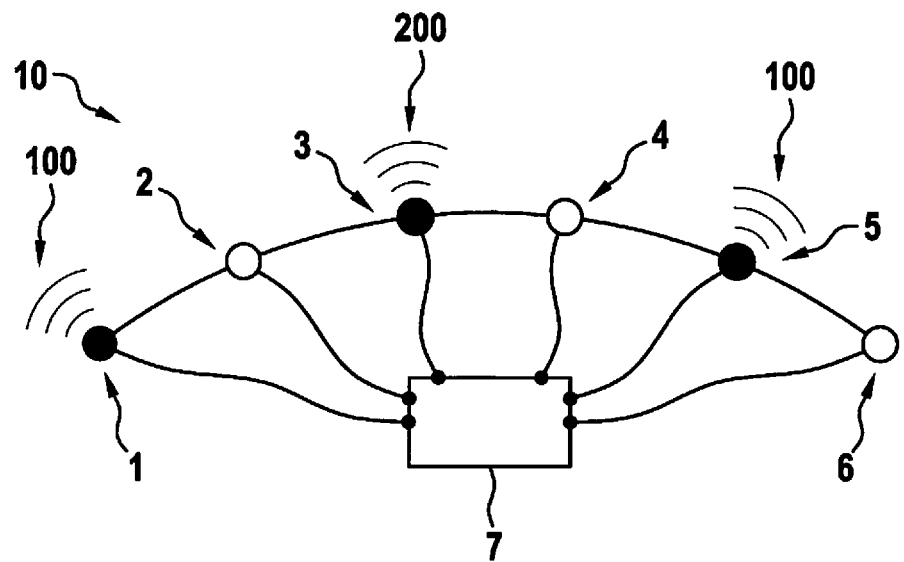
FIG. 1 is a schematic view of an ultrasonic sensor device according to a first exemplary embodiment of the present invention during the emission of ultrasonic pulses at a first point in time.
Figure 2:
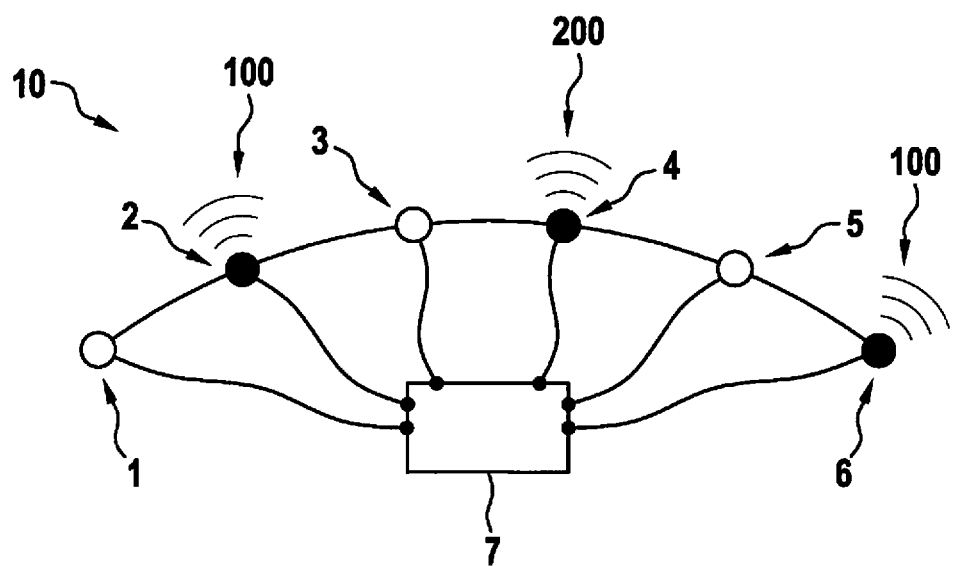
FIG. 2 is a schematic view of the ultrasonic sensor device according to the first exemplary embodiment of the present invention during the emission of ultrasonic pulses at a second point in time.

FIG. 1 schematically shows an ultrasonic sensor device 10 according to a first exemplary embodiment of the present invention during the emission of ultrasonic pulses at a first point in time. FIG. 2 shows the same ultrasonic sensor device 10 during the emission of ultrasonic pulses at a second point in time. The first point in time and the second point in time are in chronological succession.

Ultrasonic sensor device 10 includes six ultrasonic sensors 1, 2, 3, 4, 5, 6, which are divided into two adjacent first ultrasonic sensors 1, 2, two adjacent second outer ultrasonic sensors 5, 6, and two inner ultrasonic sensors 3, 4. It is provided that each inner ultrasonic sensor 3, 4 is situated adjacent to one other inner ultrasonic sensor 3, 4 and adjacent to either one first outer ultrasonic sensor 1, 2 or one second outer ultrasonic sensor 5, 6. In the exemplary embodiment shown in FIG. 1 and FIG. 2, it is provided that ultrasonic sensors 1, 2, 3, 4, 5, 6 are arranged adjacent to one another. This is the case in particular if ultrasonic sensor device 10 is used in a bumper of a vehicle. In such an arrangement, all ultrasonic sensors 1, 2, 3, 4, 5, 6 each have two neighbors with the exception of peripheral ultrasonic sensors 1, 6. Peripheral ultrasonic sensors 1, 6 only have one neighbor.

All ultrasonic sensors 1, 2, 3, 4, 5, 6 are connected to a control unit 7. Control unit 7 is selectively used for activating ultrasonic sensors 1, 2, 3, 4, 5, 6. If an ultrasonic sensor 1, 2, 3, 4, 5, 6 is activated, this thus has the result that it emits an ultrasonic pulse. If the ultrasonic sensor is not activated, this thus has the result that ultrasonic sensor 1, 2, 3, 4, 5, 6 may be used for receiving ultrasonic pulses. In this case, ultrasonic sensor 1, 2, 3, 4, 5, 6 generates a signal upon receiving an ultrasonic pulse, which is detectable by control unit 7. Each ultrasonic sensor 1, 2, 3, 4, 5, 6 is therefore either an emitter or a receiver for ultrasonic pulses depending on the operation by control unit 7.

Each ultrasonic sensor 1, 2, 3, 4, 5, 6 has a maximum bandwidth of in particular 12 kHz or 10 kHz. To be able to differentiate signals of ultrasonic sensors 1, 2, 3, 4, 5, 6 from one another, they are generated using different excitation patterns 100, 200, 300. These different excitation patterns mean that each ultrasonic sensor 1, 2, 3, 4, 5, 6 is excited using a voltage which does not have a constant frequency, but rather a continuously varying frequency. This has the result that the emitted ultrasonic pulses also do not have a constant frequency, but rather a frequency curve. The frequency curve is determined by excitation pattern 100, 200, 300. Received signals having corresponding frequency curves of excitation patterns 100, 200, 300 may be filtered out via appropriately configured matched filters. It is thus provided that outer ultrasonic sensors 1, 2, 5, 6—this means first outer ultrasonic sensors 1, 2 and second outer ultrasonic sensors 5, 6—are activated using the same frequency-modulated excitation pattern, namely first frequency-modulated excitation pattern 100. Inner ultrasonic sensors 3, 4 are activated using a frequency-modulated second excitation pattern 200. For this purpose, it is provided that control unit 7 activates in each case one first outer ultrasonic sensor 1, 2, one second outer ultrasonic sensor 5, 6, and one inner ultrasonic sensor 3, 4 at the same time. Simultaneously active ultrasonic sensors 1, 2, 3, 4, 5, 6 are not situated adjacent to one another, but rather one inactive ultrasonic sensor 1, 2, 3, 4, 5, 6 is located between active ultrasonic sensors 1, 2, 3, 4, 5, 6. This is shown in FIGS. 1 and 2. Particular active ultrasonic sensors 1, 2, 3, 4, 5, 6 are shown therein by a filled circle, while inactive ultrasonic sensors 1, 2, 3, 4, 5, 6 are shown by a non-filled circle. Active ultrasonic sensors 1, 2, 3, 4, 5, 6 therefore always have a maximum physical mechanical distance in relation to one another. In addition, adjacent active ultrasonic sensors 1, 2, 3, 4, 5, 6 emit different ultrasonic signals. An association of received ultrasonic signals with the particular emitter is thus enabled without risk of confusion.

Control unit 7 is configured to alternately activate either the first group of ultrasonic sensors 1, 3, 5, which is shown in FIG. 1, or the second group of ultrasonic sensors 2, 4, 6, which is shown in FIG. 2. Particular inactive ultrasonic sensors 1, 2, 3, 4, 5, 6 are used exclusively as receivers of ultrasonic pulses.

The individual emitted ultrasonic pulses may be optimally separated from one another. If an ultrasonic pulse, which has second excitation pattern 200, is received at one of first outer ultrasonic sensors 1, 2 after the emission shown in FIG. 1, this is thus recognizable by a corresponding matched filter. The matched filter is configured to suppress down to amplitude 0 all signals which do not have the first frequency curve of first excitation pattern 100. Therefore, only those signals are detected at first outer ultrasonic sensors 1, 2 which were also actually emitted by one of first outer ultrasonic sensors 1, 2. This applies similarly to second outer ultrasonic sensors 5, 6 and to inner ultrasonic sensors 3, 4.

To achieve an optimum differentiability of the ultrasonic pulses according to first excitation pattern 100 and according to second excitation pattern 200, it is provided that first excitation pattern 100 includes a change of the frequency having a first bandwidth of 5 kHz. The second excitation pattern also includes a change of the frequency having a second bandwidth of 5 kHz. The corresponding frequencies are changed continuously, advantageously linearly, within this first bandwidth and second bandwidth. This change is particularly advantageously opposing in first excitation pattern 100 and second excitation pattern 200. This means that in first excitation pattern 100, an increase of the frequency takes place, while in second excitation pattern 200, a decrease of the frequency takes place. Moreover, it is provided that the first frequency curve, which results from first excitation pattern 100, differs completely from a second frequency curve, which results from second excitation pattern 200. This means that all ultrasonic pulses which are generated by first excitation pattern 100 do not have a frequency in their entire bandwidth which coincides with a frequency of an ultrasonic pulse which was generated using second excitation pattern 200. In this way, the first frequency curve and the second frequency curve are prevented from partially or completely overlapping. This improves the separability of the different pulses which were generated by various excitation patterns 100, 200.

Figure 3:
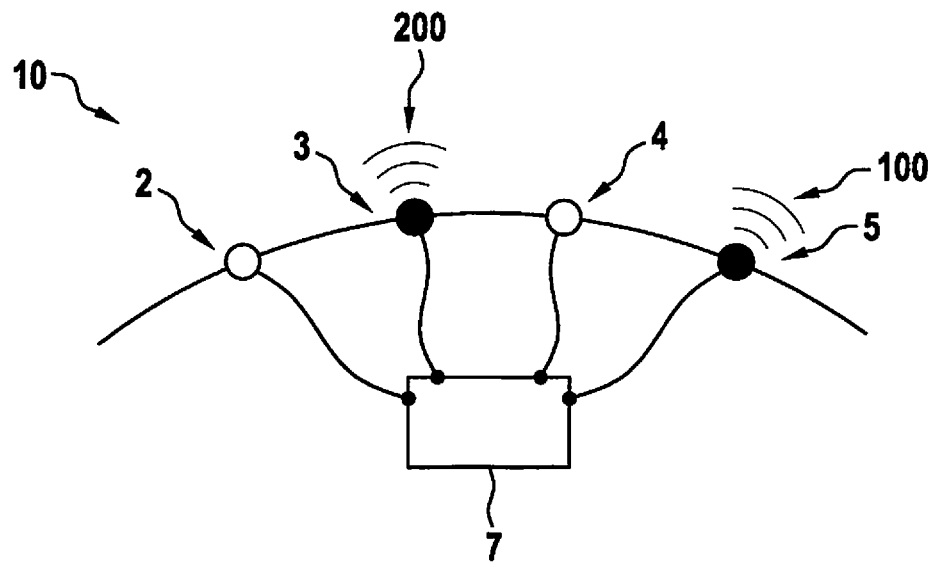
FIG. 3 is a schematic view of an ultrasonic sensor device according to a second exemplary embodiment of the present invention during the emission of ultrasonic pulses at a first point in time.
Figure 4:
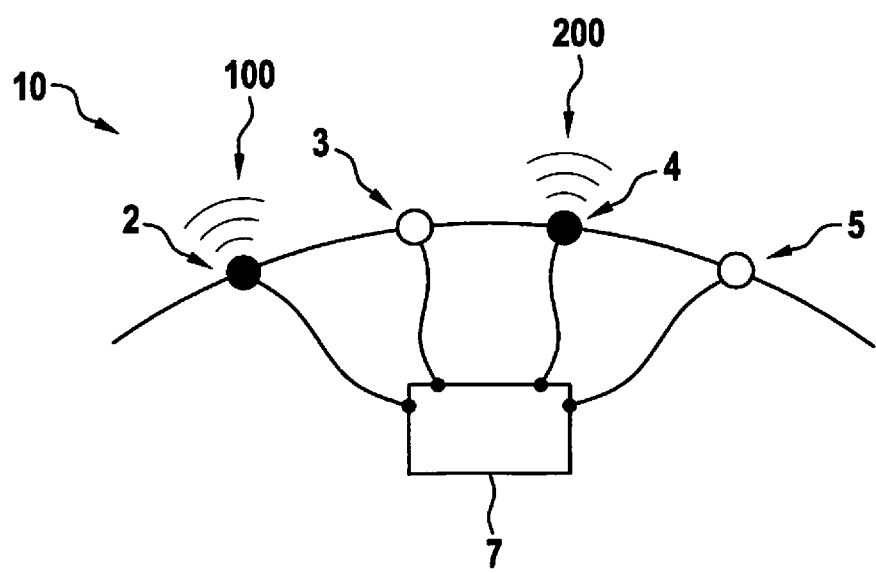
FIG. 4 is a schematic view of the ultrasonic sensor device according to the second exemplary embodiment of the present invention during the emission of ultrasonic pulses at a second point in time.

FIGS. 3 and 4 show an ultrasonic sensor device 10 according to a second exemplary embodiment of the present invention. FIG. 3 again shows the emission of ultrasonic pulses with the aid of ultrasonic sensor device 10 at a first point in time, while FIG. 4 includes the emission of ultrasonic pulses with the aid of ultrasonic sensor device 10 at a second point in time. The second exemplary embodiment is identical to the first exemplary embodiment with the exception that peripheral ultrasonic sensors 1, 6 from the first exemplary embodiment are not present. Ultrasonic sensors 2, 3, 4, 5 thus include only inner ultrasonic sensors 3, 4 and one first outer ultrasonic sensor 2 and one second ultrasonic sensor 5. The operation of ultrasonic sensors 2, 3, 4, 5 takes place similarly as described above. Therefore, a maximum separability of the emitted ultrasonic pulses is again enabled.

The maximum bandwidth of ultrasonic sensors 1, 2, 3, 4, 5, 6 is at most 10 kHz, in particular at most 12 kHz in the two above-described exemplary embodiments. By way of the selection of the first bandwidth of first excitation pattern 100 and the second bandwidth of second excitation pattern 200, the maximum bandwidth is completely or nearly completely utilized, while an overlap of the first frequency curve and the second frequency curve is prevented at the same time. Moreover, the individual ultrasonic pulses which are generated with the aid of first excitation pattern 100 and second excitation pattern 200 have a maximum possible bandwidth, which results in advantages with respect to Doppler robustness. The ultrasonic pulses may therefore be recognized and processed securely and reliably, whereby a secure and reliable, simultaneous but also rapid detection of surroundings of ultrasonic sensor device 10 is enabled.

Figure 5:
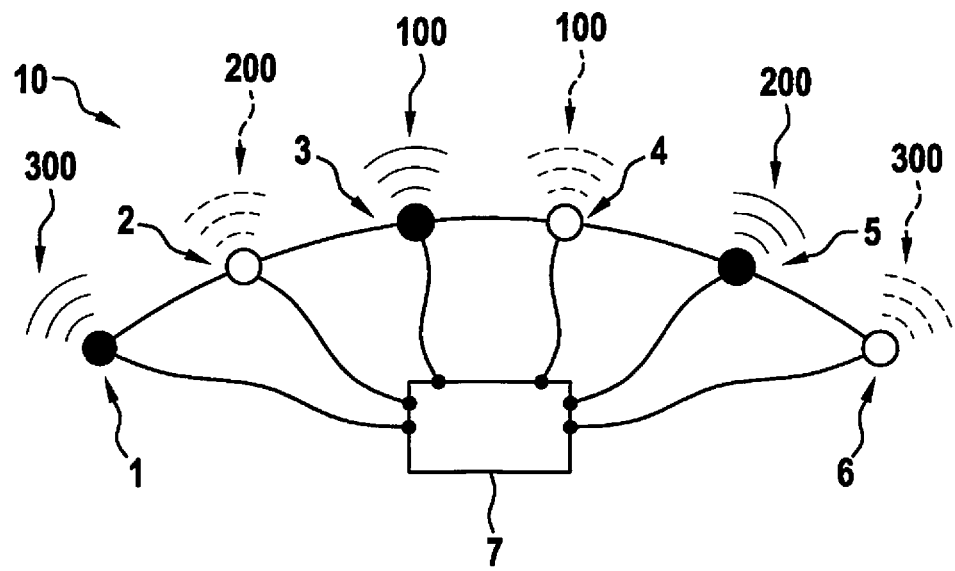
FIG. 5 is a schematic view of an ultrasonic sensor device according to a third exemplary embodiment of the present invention.

Finally, FIG. 5 shows a third exemplary embodiment of ultrasonic sensor device 10. In the third exemplary embodiment, six ultrasonic sensors 1, 2, 3, 4, 5, 6 are again provided. These ultrasonic sensors 1, 2, 3, 4, 5, 6 include four inner ultrasonic sensors 2, 3, 4, 5 situated adjacent and two outer ultrasonic sensors 1, 6. Four inner ultrasonic sensors 2, 3, 4, 5 are situated either adjacent to two further inner ultrasonic sensors 2, 3, 4, 5 or adjacent to one further ultrasonic sensor 2, 3, 4, 5 and one outer ultrasonic sensor 1, 6. Outer ultrasonic sensors 1, 6 only have one single adjacent ultrasonic sensor 1, 2, 3, 4, 5, 6, this being one of inner ultrasonic sensors 2, 3, 4, 5.

All ultrasonic sensors 1, 2, 3, 4, 5, 6 are again connected to a control unit 7. Control unit 7 is used for the simultaneous operation of a first group of ultrasonic sensors 1, 3, 5 or a second group of ultrasonic sensors 2, 4, 6. The first group of ultrasonic sensors 1, 3, 5 and the second group of ultrasonic sensors 2, 4, 6 are thus activatable alternately by control unit 7. Particular nonactivated ultrasonic sensors 1, 2, 3, 4, 5, 6 are exclusively used as receivers.

Control unit 7 is configured to operate first ultrasonic sensors 2, 3, 4, 5 either using a first excitation pattern 100 or a second excitation pattern 200. Moreover, control unit 7 is configured to operate outer ultrasonic sensors 1, 6 using a third excitation pattern 300. It is provided that in each case two adjacent inner ultrasonic sensors 2, 3, 4, 5 are activated at the same time, so that one active inner ultrasonic sensor 2, 3, 4, 5 is excited using first excitation pattern 100 and another active inner ultrasonic sensor is excited using second excitation pattern 200. This means that during the activation of the first group of ultrasonic sensors 1, 3, 5, ultrasonic pulses are emitted which were all generated by different excitation patterns 100, 200, 300. The same applies to the activation of the second group of ultrasonic sensors 2, 4, 6.

Two alternatives are possible for the design of first excitation pattern 100, second excitation pattern 200, and third excitation pattern 300. In a first alternative, all excitation patterns 100, 200, 300 include a continuous, in particular linear frequency change having a bandwidth of 3 kHz. At the same time, it is provided that the frequency curves which are generated by excitation patterns 100, 200, 300 do not overlap. It is thus ensured that each ultrasonic pulse includes a frequency which is completely different from every other ultrasonic pulse emitted by ultrasonic sensor device 10. In this way, all ultrasonic pulses may be separated securely and reliably. Moreover, in each case the maximum bandwidth of ultrasonic sensors of 12 kHz, in particular 10 kHz, is optimally utilized. The ultrasonic pulses therefore have a maximum Doppler robustness.

In a second alternative, a slight overlap of the frequencies of the ultrasonic pulses is accepted. The above-described bandwidth frequency changes of 5 kHz thus may not be sufficient for adequate Doppler robustness. It is therefore provided in the second alternative that first excitation pattern 100 takes place with a change of the frequency having a first bandwidth of 5 kHz. This also applies to second excitation pattern 200, in the case of which a frequency change also having a bandwidth of 3 kHz takes place. In the case of third excitation pattern 300, a change of the frequency takes place within a third bandwidth of 9 kHz. At the same time, it is provided that the frequency curves of first excitation pattern 100 and second excitation pattern 200 do not overlap. In contrast, the frequency curve of third excitation pattern 300 partially overlaps with the frequency curve of first excitation pattern 100 and/or the frequency curve of second excitation pattern 200. However, third excitation pattern 300 has a frequency curve which includes a high bandwidth of 9 kHz. The bandwidth of the third frequency curve of third excitation pattern 300 thus corresponds in particular to a large part of the maximum bandwidth of ultrasonic sensors 1, 2, 3, 4, 5, 6. This results in a substantially improved Doppler robustness, which may also be used for higher detection speeds of objects in the surroundings of ultrasonic sensor device 10. Inner ultrasonic sensors 2, 3, 4, 5 only emit those ultrasonic pulses whose frequencies do not overlap at any time.

In the two above-described alternatives, it is advantageous that the changes of the frequency in the case of second excitation pattern 200 oppose the change in the case of first excitation pattern 100 and third excitation pattern 300. This has the result that adjacent active ultrasonic sensors 1, 2, 3, 4, 5, 6 emit ultrasonic pulses which have an opposing frequency curve. This improves the separability of the emitted ultrasonic pulses.

Figure 6:
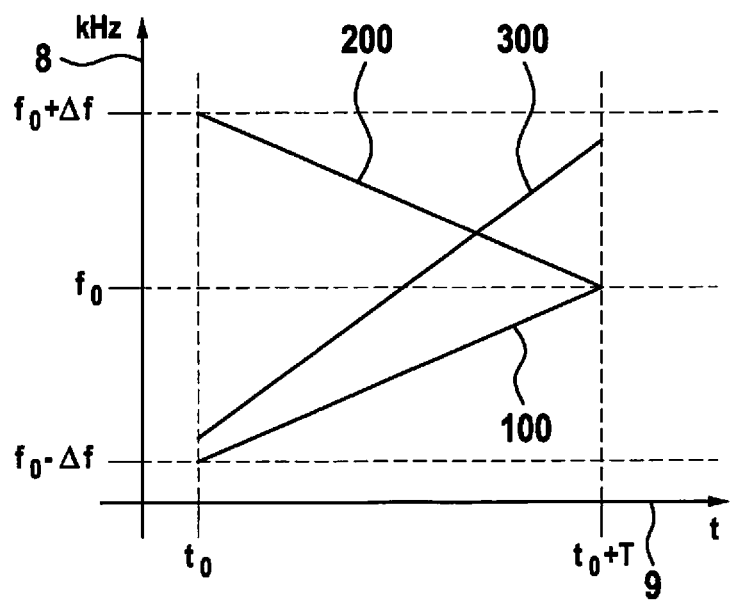
FIG. 6 is a schematic view of excitation patterns for operating the ultrasonic sensors of the ultrasonic sensor device according to one of the exemplary embodiments of the present invention.

FIG. 6 shows an advantageous curve of the frequencies for different excitation patterns 100, 200, 300. Exclusively the above-described second alternative is shown in FIG. 6. The frequency curves of excitation patterns 100, 200, 300 are shown in a coordinate system having a frequency axis 8 and a time axis 9.

The frequency curve of first excitation pattern 100 results in an increase, in particular a linear increase of the frequency by value $\Delta f$. The frequency curve of second excitation pattern 200 results in a decrease of the frequency by value $\Delta f$. Value $\Delta f$ for first excitation pattern 100 and second excitation pattern 200 thus corresponds to particular first bandwidth and second bandwidth of the frequency change. The first bandwidth and the second bandwidth are identical in this case and are advantageously each 5 kHz. The frequency curve of third excitation pattern 300 includes a substantially higher third bandwidth, in particular the above-described bandwidth of 9 kHz. It is apparent that the frequency curve of third excitation pattern 300 thus partially overlaps with the second frequency curve of second excitation pattern 200 and the first frequency curve of first excitation pattern 100. Such an overlap is accepted since at the same time a substantially enlarged third bandwidth is achieved for the frequency curve of third excitation pattern 300. This results in the above-described enhanced Doppler robustness, which results in improved timely detection of obstructions in the surroundings of ultrasonic sensor device 10.

Each excitation pattern 100, 200, 300 is advantageously carried out during a time window T of 1.6 ms. Therefore, all ultrasonic pulses which are emitted by ultrasonic sensor device 10 have the same chronological length. The changes of the frequency due to first excitation pattern 100, second excitation pattern 200, and third excitation pattern 300 extend in particular symmetrically around a standard frequency $f_0$ of 48 kHz. Such a standard frequency is advantageous for ultrasonic sensors 1, 2, 3, 4, 5, 6.

What is claimed is:

1. An ultrasonic sensor device, comprising:
   a plurality of ultrasonic sensors, wherein each of the ultrasonic sensors is an emitter and a receiver at the same time; and
   a control unit for operating the ultrasonic sensors, the control unit being configured to activate selectively either a first group of the ultrasonic sensors or a second group of the ultrasonic sensors at the same time, so that the activated ultrasonic sensors emit an ultrasonic signal, each ultrasonic sensor of the first group being situated adjacent to at least one ultrasonic sensor of the second group and each ultrasonic sensor of the second group being situated adjacent to at least one ultrasonic sensor of the first group, and wherein the control unit is configured to operate adjacent active ultrasonic sensors using different frequency-modulated excitation patterns;
   wherein the ultrasonic sensor device provides a maximization of a suppression of external codes to achieve an optimum separability of individual ultrasonic codes, so that a plurality of measurements can be carried out in a parallel processing, so that surroundings of the ultrasonic sensor device are detected in a shorter time, since the parallel processing of multiple ultrasonic signals is enabled, and
   wherein the ultrasonic sensors are operated using different linear, frequency-modulated chirps, so that the frequency of the excitation changes linearly within a predefined time window, wherein due to frequency-modulated excitation patterns, which differ in adjacent active ultrasonic sensors, and also due to separation of active ultrasonic sensors by an inactive ultrasonic sensor, each echo is associated with an ultrasonic sensor of the plurality of ultrasonic sensors, and wherein a high separability by matched filters is achieved by the frequency-modulated excitation patterns.

2. The ultrasonic sensor device as recited in claim 1, wherein the frequency-modulated excitation patterns include a continuous frequency change within a predefined bandwidth.

3. The ultrasonic sensor device as recited in claim 1, wherein each of the first group and the second group each include one half of the ultrasonic sensors.

4. The ultrasonic sensor device as recited in claim 1, wherein the ultrasonic sensors include two inner ultrasonic sensors and two outer ultrasonic sensors, each of the inner ultrasonic sensors being situated adjacent to one further inner ultrasonic sensor and one outer ultrasonic sensor, wherein the control unit is configured to activate in each case one inner ultrasonic sensor and one outer ultrasonic sensor, which are not situated adjacent, at the same time, the control unit being configured to operate the outer ultrasonic sensors using a first frequency-modulated excitation pattern and the inner ultrasonic sensors using a second frequency-modulated excitation pattern, and the first frequency-modulated excitation pattern being different from the second frequency-modulated excitation pattern.

5. The ultrasonic sensor device as recited in claim 4, wherein the first frequency-modulated excitation pattern includes a linear change of a frequency having a first bandwidth between 3 kHz and 12 kHz, the second frequency-modulated excitation pattern includes a linear change of a frequency having a second bandwidth between 3 kHz and 12 kHz, and a first frequency curve of the first frequency-modulated excitation pattern, which extends over the first bandwidth, being different from a second frequency curve of the second frequency-modulated excitation pattern, which extends over the second bandwidth.

6. The ultrasonic sensor device as recited in claim 5, wherein the first bandwidth is 5 kHz and the second bandwidth is 5 kHz.

7. The ultrasonic sensor device as recited in claim 5, wherein the first frequency curve is opposite to the second frequency curve.

8. The ultrasonic sensor device as recited in claim 1, wherein the ultrasonic sensors include two adjacent first outer ultrasonic sensors, two inner ultrasonic sensors, and two adjacent second outer ultrasonic sensors, each of the inner ultrasonic sensors being situated adjacent to one further inner ultrasonic sensor and either to one first outer ultrasonic sensor or to one second outer ultrasonic sensor, wherein the control unit is configured to activate in each case one inner ultrasonic sensor, one first outer ultrasonic sensor, and one second outer ultrasonic sensor, none of which are situated adjacent, at the same time, the control unit being configured to operate the first outer ultrasonic sensors and the second outer ultrasonic sensors using a first frequency-modulated excitation pattern and to operate the inner ultrasonic sensors using a second frequency-modulated excitation pattern, and the first frequency-modulated excitation pattern is different from the second frequency-modulated excitation pattern.

9. The ultrasonic sensor device as recited in claim 1, wherein the ultrasonic sensors include two outer ultrasonic sensors and four adjacent inner ultrasonic sensors, each of the inner ultrasonic sensors either being situated adjacent to two further inner ultrasonic sensors or to one further inner ultrasonic sensor and to one outer ultrasonic sensor, the control unit being configured to activate in each case two inner ultrasonic sensors and one outer ultrasonic sensor, none of which are situated adjacent, at the same time, the control unit being configured to operate the outer ultrasonic sensors using a first frequency-modulated excitation pattern and in each case one inner ultrasonic sensor using a second frequency-modulated excitation pattern and a third frequency-modulated excitation pattern, and the first frequency-modulated excitation pattern, the second frequency-modulated excitation pattern, and the third frequency-modulated excitation pattern being different from one another.

10. The ultrasonic sensor device as recited in claim 9, wherein the first frequency-modulated excitation pattern includes an in particular linear change of a frequency having a first bandwidth between 3 kHz and 12 kHz, the second frequency-modulated excitation pattern includes an in particular linear change of a frequency having a second bandwidth between 3 kHz and 12 kHz, the third frequency-modulated excitation pattern includes a linear change of a frequency having a third bandwidth between 3 kHz and 12 kHz, and a first frequency curve of the first frequency-modulated excitation pattern, which extends over the first bandwidth, a second frequency curve of the second frequency-modulated excitation pattern, which extends over the second bandwidth, and a third frequency curve of the third frequency-modulated excitation pattern, which extends over the third bandwidth, are all different from one another.

11. The ultrasonic sensor device as recited in claim 10, wherein the first bandwidth, the second bandwidth, and the third bandwidth are each 3 kHz.

12. The ultrasonic sensor device as recited in claim 9, wherein the first frequency-modulated excitation pattern includes a linear change of a frequency having a first bandwidth between 3 kHz and 12 kHz, the second frequency-modulated excitation pattern includes a linear change of a frequency having a second bandwidth between 3 kHz and 12 kHz, the third frequency-modulated excitation pattern includes a linear change of a frequency having a third bandwidth between 3 kHz and 12 kHz, and a first frequency curve of the third frequency-modulated excitation pattern, which extends over the third bandwidth, is partially overlaid with a first frequency curve of the first frequency-modulated excitation pattern, which extends over the first bandwidth, and/or is partially overlaid with a second frequency curve of the second frequency-modulated excitation pattern, which extends over the second bandwidth.

13. The ultrasonic sensor device as recited in claim 12, wherein the first bandwidth is 5 kHz, the second bandwidth is 5 kHz, and the third bandwidth is 9 kHz.

14. The ultrasonic sensor device as recited in claim 10, wherein the first frequency curve is opposite to the second frequency curve and/or the first frequency curve is opposite to the third frequency curve, and/or the third frequency curve is opposite to the second frequency curve.

* * * * *